3,294,544
ARTIFICIAL SWEETENER - ARABINOGALACTAN COMPOSITION AND EDIBLE FOODSTUFF UTILIZING SAME
George L. Stanko, Cincinnati, Ohio, assignor to Richardson-Merrell Inc., New York, N.Y., a corporation of Delaware
No Drawing. Filed Nov. 6, 1964, Ser. No. 409,605
13 Claims. (Cl. 99—79)

This invention relates to low calorie compositions containing artificial sweetening agents. More particularly this invention relates to a low calorie composition of arabinogalactan and artificial sweeteners which can be substituted for sucrose and other high caloric sweeteners for use in beverages and various other food products.

Many adults need to restrict their intake of ordinary high caloric foods to prevent or control overweight. A key component of calorie reduced foods are synthetic sweeteners, such as the saccharins and cyclamates.

The artificial sweeteners, however, do not impart the mouth feel, viscosity, or bodying properties of sugar nor do they depress the freezing point of water. Moreover, there is a considerable loss of bulk when artificial sweeteners replace carbohydrates in a food formulation. These factors require the use of various hydrophillic colloids together with the sweeteners, such as carboxymethyl cellulose, alginates, gelatin, or carrageenan.

Although compositions of the above-mentioned hydrophillic colloids in combination with an artificial sweetener overcome some of the problems of using the artificial sweetener alone, they still lack many of the physical and organoleptic properties of the traditional or accustomed sweetening agents such as sucrose. Illustratively, many of the marine and vegetable gums reduce the incidence of sandiness in ice cream. Gelatin often is smooth and clings to the roof of the mouth. Carrageenan is extremely smooth, airy, and melts in the mouth. Alginates are pasty, rough, almost gritty. Other differences that exist include those relating to solubilities of the gel and various organoleptic properties. Carboxymethyl cellulose in quanties approaching that of sugar produces an excessively viscous product whereas smaller quanties of the cellulose lack the bulking properties of sugar.

It has now been found that larch arabinogalactan or simply arabinogalactan, in admixture with an artificial sweetener provides a sugar replacement which is devoid of most of the shortcomings of prior non-caloric bulking and bodying agents. Arabinogalactan has much the same bodying, bulking, and other physical and organoleptic properties of sugar (sucrose) except for sweetness which can be supplied by an artificial sweetener. Arabinogalactan is substantially non-digestible and therefore does not contibute calories, does not produce much of an increase in viscosity of liquids, and does not possess many of the shortcomings of other materials used as bodying or bulking agents with artificial sweeteners.

Arabinogalactan is a natural gum that occurs in the genus larix. Western larch contains large amounts of arabinogalactan, ranging from 8 percent to 25 percent on a dry wood weight basis. The empirical formula for arabinogalactan is reported in the literature as $$[(C_5H_8O_4)(C_6H_{10}O_5)_6]_x$$

and appears to be a highly branched polymer or arabinose and galactose in the ratio of 1:6 respectively. Its average molecular weight is from about 70,000 to about 95,000. The particle size of the arabinogalactan for use in this invention is not critical, provided that it can be easily admixed in the food product. Thus it can be powdered or in small lumps, or in solution with water, preferably together with the artificial sweetener.

Illustrative of artificial sweetening agents which can be employed in this invention, there can be mentioned, sulfimides, e.g., saccharin; ureas, e.g. p-ethoxyphenylurea; sulfamic acids, e.g. sodium or calcium cyclamate; m-nitroanilines, e.g. 2-propoxy-5-nitroaniline; oximes, e.g. perillaldehyde oxime; amides, e.g. 2-hexyl-2-chloromalondiamide; hydrazines, e.g. succinic acid dihydrazides; imino nitriles, e.g. β-(p-tolyl)-β-imino-β-propionitrile); aromatic keto carboxylic acids, e.g. 2-(p-methoxybenzoyl)benzoic acid; triazine derivatives, e.g. glucin; and benzimidazole derivatives, e.g. 2-benzimidazolepropionic acid. The preferred artificial sweeteners are the various water soluble sulfimides and sulfamic acid salts or mixtures of these such as sodium saccharin, calcium saccharin, and ammonium saccharin, water soluble salts of cyclohexyl sulfamates also sometimes referred to herein as cyclamates, e.g. calcium cyclohexyl sulfamate, magnesium cyclohexyl sulfamate, and potassium cyclohexyl sulfamate. A particularly preferred mixture is that of about ten parts of a cyclamate to one part of a saccharin.

The proportions of arabinogalactan and artificial sweetener to each other and in the food product will vary dependent on the particular food, the artificial sweetener employed and the desired physical and organoleptic properties of the final composition.

As a sugar substitute, the arabinogalactan preferably replaces sugar (sucrose) on the same weight basis, e.g. one pound of sugar is replaced with the same weight of arabinogalactan. A quantity of sweetener sufficient to give an equivalent sweetness to the arabinogalactan on a weight basis as the same quantity of sugar is preferably admixed with the arabinogalactan.

The proportion of artificial sweetener to arabinogalactan can vary over a wide range such as that of from about 0.005 percent to 10 percent by weight of the arabinogalactan. Of course this will depend on the particular sweetener or combination of sweeteners employed. Illustratively, cyclamates are about thirty times sweeter than ordinary sugar whereas saccharin is about 375 times sweeter. In a preferred composition from about 0.2 to 7 percent by weight of sweetener and particularly from about 1 to 4 percent by weight based on the weight of arabinogalactan is employed. The quantity of arabinogalactan in a food composition, will preferably vary from about 5 percent to 70 percent by weight of the entire food composition and particularly from about 10 percent to about 25 percent by weight of the entire food composition, including the arabinogalactan and artificial sweetener. However, this will vary with the particular food product, as in the case of adding conventional sugar.

Particularly preferred foods containing the bulking and sweetener composition of this invention are beverages such as carbonated beverages and canned fruit juices; baked goods such as cakes and cookies; icings; candy; frozen desserts such as ice cream and sherberts; jams and jellies; canned fruit; puddings and custards; pie fillings; syrups and sauces; liquors and sweetened wines; and salad dressings. Additionally, syrup bases for orally administered pharmaceutical products can be prepared with the bulking and sweetener of this invention. These foods and pharmaceutical base syrups can be prepared by simply following the normal preparation of such products but simply substituting arabinogalactan for sugar and also adding an appropriate quantity of artificial sweetener. The following examples are illustrative of the invention.

EXAMPLE 1

A low calorie maple syrup can be formulated by admixing the following ingredients with a sufficient quantity of caramel for color and maple flavor to the desired taste:

| | | |
|---|---|---|
| Arabinogalactan | grams | 500 |
| Cyclamate, sodium | do | 7.5 |
| Saccharin, sodium | do | 0.75 |
| Sorbitol solution | milliliters | 50.0 |
| Benzoic acid | gram | 1.0 |
| Water, purified, q.s. to make 1000 milliliters | | |

EXAMPLE 2

A sugar substitute can be prepared by admixing and granulating the following ingredients:

| | Grams |
|---|---|
| Arabinogalactan | 900 |
| Cyclamate, sodium | 30 |
| Saccharin, sodium | 3 |

The product of this example approximates the sweetness, in bulk, of natural sugar without the caloric content. This product can be used in dietetic ice cream, low calorie ice cream toppings, puddings, pies, icings, cakes, liquors, etc. The above product (weighing 933 grams fairly replaces the body, viscosity, and sweetness of about 900 grams of sugar (sucrose).

EXAMPLE 3

A low calorie carbonated beverage can be prepared by placing 1 ounce of the below formulation in a 7-ounce bottle and filling the bottle with carbonated water containing 12 percent by weight of arabinogalactan:

| | | |
|---|---|---|
| Water, 190–210° F. | gallons | 21 |
| Calcium cyclamate | pounds | 9.5 |
| Sodium benzoate | ounces | 12.5 |
| Water, cold | gallons | 62.5 |
| Flavor | do | 3 |
| Citric acid (50 percent solution) | do | 1.25 |
| Water q.s. 100 gallons | | |

Broadly, carbonated and other beverages normally containing sugar can be prepared by simply using the usual ingredients and procedures but substituting an equal weight of arabinogalactan for the sugar and further adding about 1 percent by weight of the arabinogalactan of an artificial sweetener, e.g., a mixture of a cyclamate and a saccharin.

EXAMPLE 4

Chocolate candy can be prepared with the below listed ingredients together with the use of the following procedure:

2 cups of powdered arabinogalactan
14 grams of a 10:1 mixture of sodium cyclamate and saccharin
2 teaspoons corn syrup
1 cup of milk
2 tablespoons butter
1 teaspoon vanilla
2 ounces chocolate
½ teaspoon salt Heat the arabinogalactan, syrup, milk, chocolate, and salt over low heat, with stirring to about 230° F. Add butter and vanilla. Cool and press into desired shapes.

EXAMPLE 5

Uncooked fulge can be prepared with the below listed ingredients as follows:

4 squares (4 ounces) chocolate
½ cup butter
1 pound of arabinogalactan, powdered
0.05 pound of sodium cyclamate
1 egg, beaten slightly
¼ cup of condensed milk
1 teaspoon vanilla Melt chocolate and butter in top of double boiler. Mix egg with the arabinogalactan and cyclamate; add milk, and stir in the chocolate-butter mixture. Add vanilla. Turn into pan; chill.

A sherbet can be prepared by intimately admixing the following ingredients and cooling the mixture to about 28° F. until it has solidified.

| | | |
|---|---|---|
| Arabinogalactan, powdered | pounds | 11.0 |
| Artificial sweetener, a mixture of 10 parts of calcium cyclamate and 1 part of saccharin sodium | ounces | 3.0 |
| Corn syrup solids | pounds | 10 |
| Ice cream mix (12% fat, 11% m.s.n.f., and 15% arabinogalactan) | do | 17.5 |
| Stabilizer | do | 0.4 |
| Fruit puree | do | 15.0 |
| Water and 10.75 ounces of 50% citric solution and color | do | 46.1 |

EXAMPLE 6

Ingredients for white butter icing:

⅓ cup soft butter or other shortening
3 cups of powdered arabinogalactan
1 ounce of a 12:1 mixture of sodium cyclamate and sodium saccharin
1.5 teaspoons of vanilla
3 tablespoons of cream or rich milk The shortening, arabinogalactan and mixture of cyclamate and saccharin are blended and the vanilla and cream are stirred into the blend until smooth.

EXAMPLE 7

Orange jelly can be prepared with the below listed ingredients and by following the below described procedure.

2 tablespoons gelatin
1 cup cold water
1 cup boiling water
1 cup of powdered arabinogalactan containing about 2 percent by weight of artificial sweeteners
1.5 cups orange juice
3 tablespoons lemon juice Soak gelatin in cold water five minutes; dissolve in boiling water. Add arabinogalactan and sweeteners. Stir well; add orange and lemon juice. Pour into wet mold. Chill until firm.

EXAMPLE 8

A heavy chocolate syrup can be prepared with the below listed ingredients.

2 pounds of high quality cocoa
0.5 gallon of milk
1 level teaspoon of salt
12 pounds powdered arabinogalactan
0.4 pound of a 10 to 1 mixture respectively of sodium cyclamate and sodium saccharin
0.5 gallon of water Mix cocoa, arabinogalactan and sweeteners together dry. Put salt in water, add the milk, and bring to boiling point. Gradually work in the cocoa-arabinogalactan-sweeteners mixture and bring back to boiling point, stirring constantly. Turn off the heat, whip smooth, add one ounce of vanilla extract, strain, put in covered container and cool rapidly.

EXAMPLE 9

This example shows a formula for a syrup base for pharmaceutical products useful for oral liquid dose forms. The quantity of arabinogalactan can vary from about 0.5 percent to about 60–70 percent by weight of the unmedicated syrup and the quantity of artificial sweetener can vary within the ranges set forth hereinbefore for food products. Water, preservatives, color and flavor are added as desired while staying within the above quantity ranges for the bulking agent.

Powdered arabinogalactan _____ grams__ 550
Sodium cyclamate _____ do____ 4.0
Preservative, color and flavor _____ Q.S.
Water to make 1000 milliliters.

What is claimed is:

1. A composition of matter comprising a mixture of arabinogalactan and an artificial sweetener, the proportion of artificial sweetener to arabinogalactan in said mixture being from about 0.005% to 10% by weight of the arabinogalactan.

2. A composition of claim 1 wherein the artificial sweetener is a cyclamate.

3. A composition of claim 1 wherein the artificial sweetener is a saccharin.

4. A bulking and sweetening composition comprising a mixture of arabinogalactan and an artificial sweetener, said composition containing from about 0.2 percent to about 7 percent by weight of artificial sweetener based on the weight of arabinogalactan.

5. A composition of claim 4 wherein the artificial sweetener varies from about 0.5 percent to about 6 percent.

6. A composition of claim 5 wherein the sweetener is a mixture of a cyclamate and a saccharin wherein the weight ratio of cyclamate to saccharin varies from about 5 to 20 parts of cyclamate per part of saccharin.

7. A food product containing a mixture of arabinogalactan and an artificial sweetener, said food product normally fortified with sugar, the proportion of artificial sweetener to arabinogalactan in said mixture being from about 0.005% to 10% by weight of the arabinogalactan.

8. A food product of claim 7 wherein the quantity of arabinogalactan in the food product varies from about 10 percent to about 25 percent by weight of the food product.

9. A carbonated beverage containing a mixture of arabinogalactan and an artificial sweetener, the proportion of artificial sweetener to arabinogalactan in said mixture being from about 0.2% to 7% by weight of the arabinogalactan.

10. A candy product containing a mixture of arabinogalactan and an artificial sweetener, the proportion of artificial sweetener to arabinogalactan in said mixture being from about 0.2% to 7% by weight of the arabinogalactan.

11. A frozen dessert containing a mixture of arabinogalactan and an artificial sweetener, the proportion of artificial sweetener to arabinogalactan in said mixture being from about 0.2% to 7% by weight of the arabinogalactan.

12. A baked food product containing a mixture of arabinogalactan and an artificial sweetener, the proportion of artificial sweetener to arabinogalactan in said mixture being from about 0.2% to 7% by weight of the arabinogalactan.

13. An aqueous syrup base for pharmaceutical products comprising water, arabinogalactan, and an artificial sweetener, the proportion of artificial sweetener to arabinogalactan in said mixture being from about 0.2% to 7% by weight of the arabinogalactan.

References Cited by the Examiner

UNITED STATES PATENTS

| | | | |
|---|---|---|---|
| 1,933,732 | 11/1933 | Haskins et al. | 99—136 |
| 2,803,551 | 8/1957 | Helgren | 99—141 |
| 2,876,107 | 3/1959 | Jucaitis et al. | 99—141 |
| 3,087,821 | 4/1963 | Horowitz et al. | 99—141 |

OTHER REFERENCES

Chemical Abstracts, vol. 28, 1934, pages 306–307.
Walder, Food, vol. 18, 1949, pages 4–6.
Whistler et al. Industrial Gums, Academic Press, New York, 1959, pages 271 and 308–309.

A. LOUIS MONACELL, *Primary Examiner.*

RAYMOND N. JONES, S. E. HEYMAN,
*Assistant Examiners.*